W. A. GEIGER.
RETAINING MEMBER FOR ANTIFRICTION ELEMENTS IN SIDE BEARINGS.
APPLICATION FILED JULY 5, 191

1,372,682.

Patented Mar 29, 1921.

Witnesses
Charles E. Dath

Inventor
William A. Geiger
By George J. Haight
Atty.

UNITED STATES PATENT OFFICE.

WILLIAM A. GEIGER, OF CHICAGO, ILLINOIS, ASSIGNOR TO WILLIAM H. MINER, OF CHAZY, NEW YORK.

RETAINING MEMBER FOR ANTIFRICTION ELEMENTS IN SIDE BEARINGS.

1,372,682.

Specification of Letters Patent. Patented Mar. 29, 1921.

Application filed July 5, 1919. Serial No. 308,715.

*To all whom it may concern:*

Be it known that I, WILLIAM A. GEIGER, a citizen of the United States, residing at Chicago, in the county of Cook and State of Illinois, have invented a certain new and useful Improvement in Retaining Members for Antifriction Elements in Side Bearings, of which the following is a full, clear, concise, and exact description, reference being had to the accompanying drawings, forming a part of this specification.

My invention relates to improvements in retaining members for anti-friction elements in side bearings.

The object of my invention is to provide a simple retaining member for the anti-friction element in a side bearing and one which can be easily and securely mounted in the carrying member for the anti-friction element.

I have illustrated my invention in connection with a side bearing for railway cars.

Figure 1:
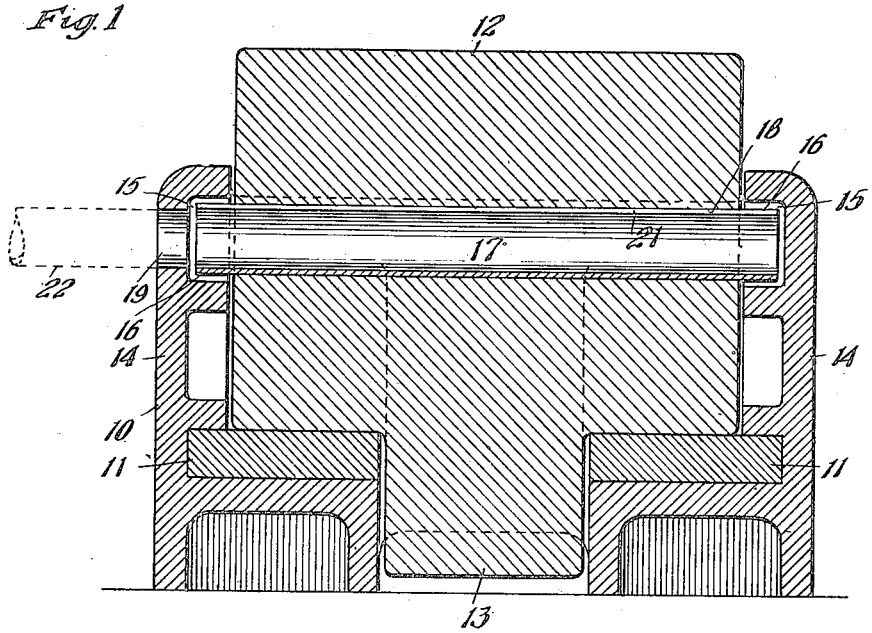
Figure 2:
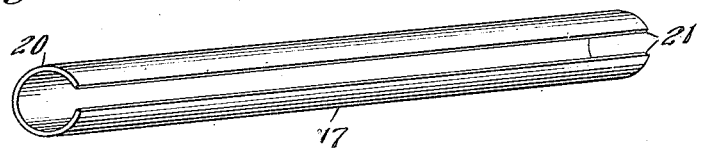

In the drawings forming a part of this specification, Figure 1 is a vertical transverse section of a side bearing embodying my invention. Fig. 2 is a perspective view of a retaining member therefor.

Referring to the drawings, the numeral 10 indicates a base member for a railroad side bearing having the spaced-apart bearing members 11—11 mounted therein and upon which the anti-friction element—as, for instance, the roller 12, is adapted to roll, the said roller being provided with a counterbalance 13 extended between the bearing members 11 in order that the said anti-friction element 12 may be self-centering through gravity. The side walls 14—14 of the base member are each provided with the longitudinally extending grooves 15 to receive the ends 16—16 of a retaining member 17, which passes through the axial perforation 18 in the anti-friction element 12. In one of the side walls of the base member 14, a perforation 19 is provided entering one of the grooves 16. The said perforation is smaller than the diameter of the retaining member 17 so that the same, when in its position within the member 12, cannot be accidentally displaced therefrom. The said retaining member 17 is made of resilient material—as, for instance, spring steel—and comprises a plate 20 curved into a general cylindrical form, as shown in Fig. 2 of the drawings, with the edges thereof spaced apart, as indicated at 21. In inserting the member 17, the same is compressed sufficiently—as, for instance, until the edges 21 thereof meet—to reduce its diameter so that it may pass through the constricted opening 19, as indicated by the dotted lines 22 in Fig. 1 of the drawings, so that it can be passed therethrough and into its position in the anti-friction element 12, as illustrated in Fig. 1 of the drawings. When within the element 12, and with its outer end free from the opening 19, the retaining member, being of resilient material, will expand, engaging the walls of the opening 18 within the element 12, the ends of the said member 17 being within the grooves 16 provided in the side walls of the base member. The enlargement of its diameter through the said expansion will prevent its accidental displacement through the constricted opening 19 in the base member.

I claim:

1. In a side bearing for railway cars, the combination with a housing adapted to be secured to a bolster and having side walls between which the anti-friction element is adapted to move, one of said walls having an opening therethrough, of an anti-friction element movable back and forth within said housing and having an opening extending therethrough of larger diameter than and adapted to be alined with said opening in the side wall; and a hollow radially compressible and expansible elongated member of normally greater circumference than that of the opening in said side wall, said member being compressible to be inserted through said opening in the side wall into the opening of the anti-friction element and expansible within the latter to prevent passage through said opening in the side wall.

2. In a bearing member, the combination with an anti-friction element having an opening therethrough, of a supporting member for said element and a retaining member for the anti-friction element, the supporting member being provided with a constricted opening, the retaining member comprising a resilient element constrictable to pass through said opening and expansible to a diameter greater than said opening.

3. In a bearing member, the combination with an anti-friction element, of a retaining member passing through said element and a guiding member for the ends thereof, the guiding member having a constricted opening therein, the retaining member being of a resilient material compressible to pass through said opening and expansible to a diameter greater than said opening.

4. In a bearing member, the combination with an anti-friction roller element, of a retaining member extending from said element, and a guiding member for the said element, said guiding member having a constricted opening for the passage of said retaining member, the retaining member being constrictable to pass through said opening and expansible to a diameter greater than the said opening.

5. In a device of the character described, the combination with a roller, of a retaining member therefor comprising a plate of resilient material conformed to a general cylindrical shape and having spaced-apart longitudinally extending edges, said edges being adapted to approach each other to reduce the diameter of the retaining member.

In witness that I claim the foregoing I have hereunto subscribed my name this 16th day of June 1919.

WILLIAM A. GEIGER.